May 29, 1928.

J. MALÝ

1,671,301

DEVICE FOR PRODUCING OSCILLATORY MOTION

Filed April 30, 1927

Inventor:
Josef Malý.

Patented May 29, 1928.

1,671,301

UNITED STATES PATENT OFFICE.

JOSEF MALÝ, OF MELNIK, CZECHOSLOVAKIA.

DEVICE FOR PRODUCING OSCILLATORY MOTION.

Application filed April 30, 1927, Serial No. 187,922, and in Czechoslovakia June 25, 1926.

This invention relates to a device for imparting oscillatory motion to sieves and shaking grates of milling, thrashing and other agricultural machines, its object being to obviate the additional friction and the inaccessible lubricating points incurred by the usual employment of cranks for this purpose.

The invention consists in arranging the oscillatory element on a rock shaft carrying a lever arm whereon a pulley is mounted, a belt running on said pulley being fitted on its inside with projections which cause a bodily displacement of the pulley and rock shaft.

The projections may be formed of arched bands of corrugated metal.

Figure 1:
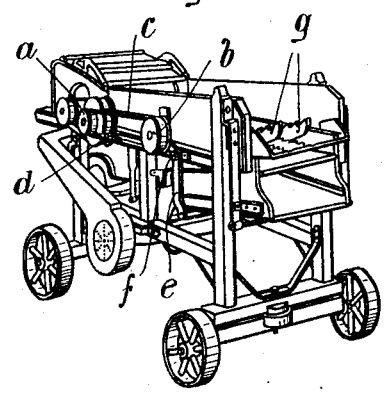
Figure 2:
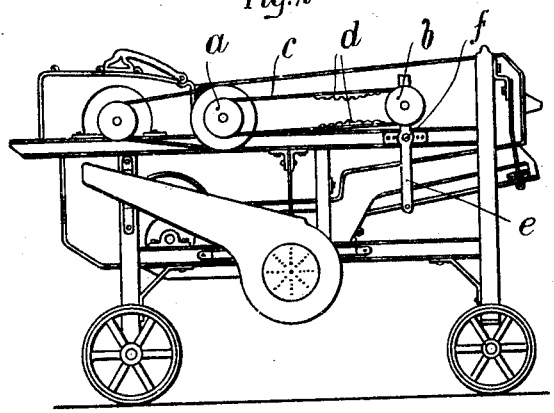
Figure 3:
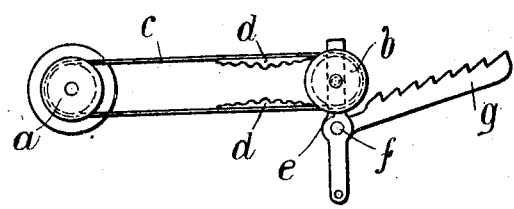

The invention is illustrated in the accompanying drawings in connection with a thrashing machine, Fig. 1 representing a perspective view of the machine, Fig. 2, a side view of the same, and Fig. 3, a view on an enlarged scale of the oscillating device.

In the present instance the thrashing machine is fitted with a shaking grate composed of bars $g$ which are secured to a rock shaft $f$. Mounted on the latter is an arm $e$ which carries a pulley $b$. Another pulley $a$ drives the pulley $b$ by means of a belt $c$ which is provided on its inside with one or more projections $d$ adapted to cause a bodily displacement of the pulley $b$ about the supporting shaft $f$, oscillatory movement being thus imparted to the bars $g$ through the medium of the shaft $f$.

The projections $d$ should be resilient and may for this purpose be formed, as shown, of arched, corrugated metal plates or bands secured at the ends to the belt.

The construction of the different elements may be varied according to requirements. In the arrangement shown, the weight of the bars $g$ would keep the belt $c$ taut. In some cases it may be necessary to introduce a spring for this purpose.

I claim:

1. A device for producing oscillatory motion comprising a rock shaft, a radial arm secured to said shaft, a pulley mounted on said arm at a distance from the shaft, a driving pulley supported by rigid bearings, a belt arranged on the two pulleys, and projections applied to the inside of said belt so as to cause a displacement of the driven pulley about the axis of the shaft.

2. A device according to claim 1 wherein the projections are composed of arched, corrugated metal plates.

JOSEF MALÝ.